(12) United States Patent
Foreman

(10) Patent No.: US 10,605,893 B2
(45) Date of Patent: Mar. 31, 2020

(54) RADAR SATURATING CLUTTER MITIGATION BY WAVEFORM SELECTION

(71) Applicant: Terry Lee Foreman, Colonial Beach, VA (US)

(72) Inventor: Terry Lee Foreman, Colonial Beach, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 16/420,719

(22) Filed: May 23, 2019

(65) Prior Publication Data

US 2020/0025874 A1     Jan. 23, 2020

Related U.S. Application Data

(63) Continuation-in-part of application No. 14/296,297, filed on Jun. 4, 2014.

(51) Int. Cl.
*G01S 7/28* (2006.01)
*G01S 7/40* (2006.01)
*G01S 13/524* (2006.01)

(52) U.S. Cl.
CPC ......... *G01S 7/2813* (2013.01); *G01S 13/5244* (2013.01); *G01S 2007/4013* (2013.01)

(58) Field of Classification Search
CPC ............... G01S 7/2813; G01S 13/5244; G01S 2007/4013
See application file for complete search history.

(56) References Cited

U.S. PATENT DOCUMENTS

| | | | |
|---|---|---|---|
| 5,061,934 A | 10/1991 | Brown et al. | 342/159 |
| 6,747,593 B1 | 6/2004 | Jaffer | 342/160 |
| 7,671,788 B2 | 3/2010 | Inaba | 342/109 |
| 7,773,029 B1 | 8/2010 | Bachman | 342/159 |
| 8,094,060 B2 | 1/2012 | Beard et al. | 342/91 |
| 8,599,060 B2 | 12/2013 | Vanuytven | 342/36 |
| 2015/0301158 A1 | 10/2015 | Foreman | G01S 7/2813 |

FOREIGN PATENT DOCUMENTS

EP     2342581     2/2015

OTHER PUBLICATIONS

A. B. White et al., "Extending the Dynamic Range of an S-Band Radar for Cloud and Precipitation Studies". *J. of Atmos. and Oceanic Tech.* 17, 1226-1234. http://www.esrl.noaa.gov/psd/people/allen.b.white/Shand_radar_paper.pdf.
Mahafza, B. R., *Radar Systems Analysis and Design using MATLAB*, Chapman & Hall, 2000, pp. 159-170. http://the-eye.eu/public/WorldTracker.org/Mathematics/All MATLAB Books Collection/Radar Systems Analysis and Design Using MatLab—Mahafza Bassem R.pdf.

*Primary Examiner* — Matthew M Barker
(74) *Attorney, Agent, or Firm* — Gerhard W. Thielman

(57) ABSTRACT

A computer-implemented method is provided for maximizing surveillance volume in a radar system. This includes determining saturation range probability $\bar{f}_{sat}$; determining sensitivity probability $f_{sens}$; calculating surveillance volume from multiplying the saturation range probability by the sensitivity probability as $V_s = \bar{f}_{sat} f_{sens}$; and adjusting the radar system to maximize the surveillance volume.

2 Claims, 10 Drawing Sheets

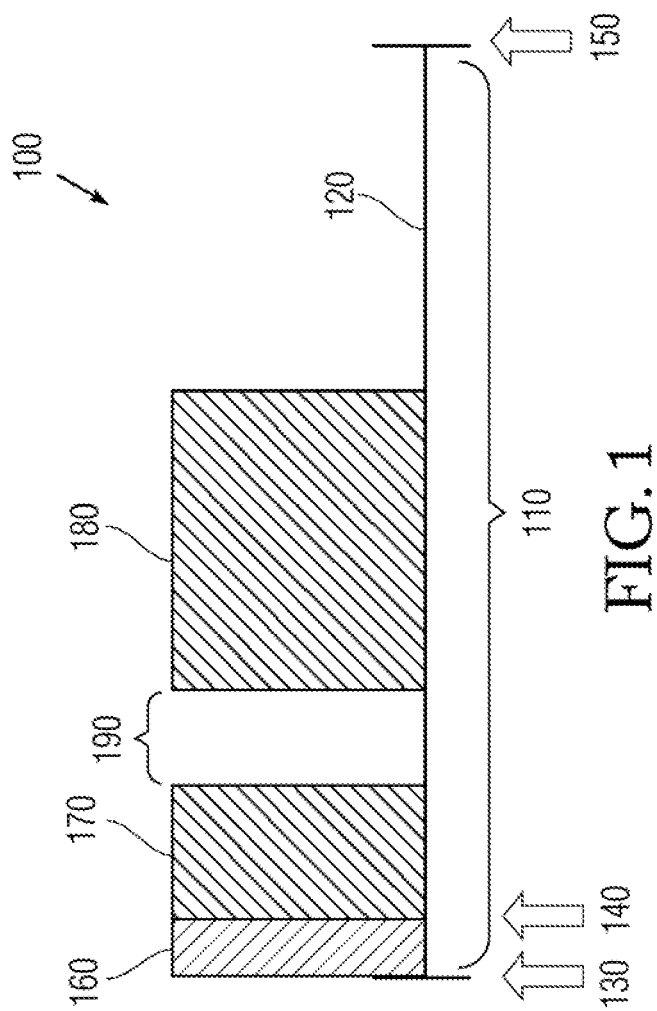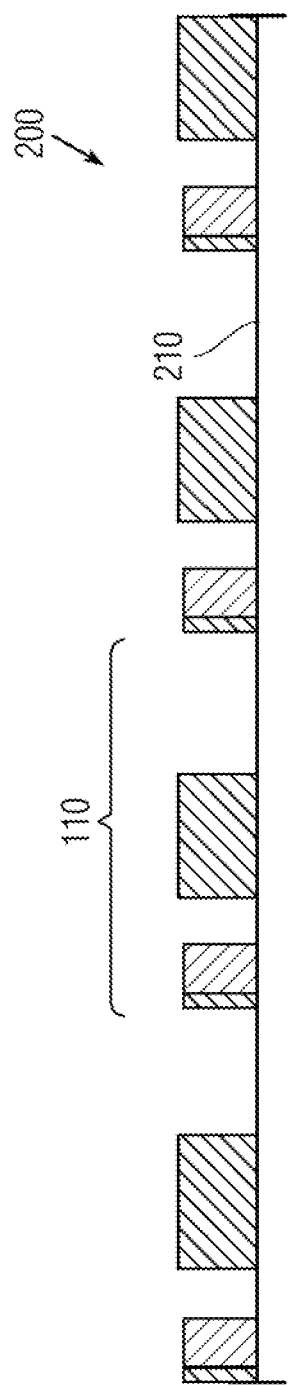

| Table I | | | | | |
|---|---|---|---|---|---|
| Case I - 1 Scatterer with 10 dB Saturation | | | | | |
| Transmitter Power 810 | Duty 820 | Sensitivity Reduction dB 830 | $\bar{f}_{sat}$ 840 | $f_{sens}$ 850 | $V_s$ 860 |
| High | 10% | 0 dB | 0.8 | 1.00 | 0.8 |
| High | 5% | 3 dB | 0.9 | 0.80 | 0.72 |
| High | 1% | 10 dB | 0.98 | 0.50 | 0.49 |
| Low | 10% | 8 dB | 0.8 | 0.58 | 0.46 |
| Low | 5% | 11 dB | 0.9 | 0.48 | 0.43 |
| Low | 1% | 18 dB | 0.98 | 0.30 | 0.29 |

FIG. 8

| Table II | | | | | |
|---|---|---|---|---|---|
| Case II - 5 Non-overlapping Scatterers with 10 dB Saturation | | | | | |
| Transmitter Power 910 | Duty 920 | Sensitivity Reduction dB 930 | $\bar{f}_{sat}$ 940 | $f_{sens}$ 950 | $V_s$ 960 |
| High | 10% | 0 dB | 0 | 1.00 | 0 |
| High | 5% | 3 dB | 0.50 | 0.80 | 0.40 |
| High | 1% | 10 dB | 0.90 | 0.50 | 0.45 |
| Low | 10% | 8 dB | 0 | 0.58 | 0 |
| Low | 5% | 11 dB | 0.50 | 0.48 | 0.24 |
| Low | 1% | 18 dB | 0.90 | 0.30 | 0.27 |

FIG. 9

| Table III | | | | | |
|---|---|---|---|---|---|
| Case III - 5 Non-overlapping Scatterers with 6 dB Saturation | | | | | |
| Transmitter Power 1010 | Duty 1020 | Sensitivity Reduction dB 1030 | $\bar{f}_{sat}$ 1040 | $f_{sens}$ 1050 | $V_s$ 1060 |
| High | 10% | 0 dB | 0 | 1.00 | 0 |
| High | 5% | 3 dB | 0.50 | 0.80 | 0.40 |
| High | 1% | 10 dB | 0.90 | 0.50 | 0.45 |
| Low | 10% | 8 dB | 1 | 0.58 | 0.58 |
| Low | 5% | 11 dB | 1 | 0.48 | 0.48 |
| Low | 1% | 18 dB | 1 | 0.30 | 0.30 |

FIG. 10

RADAR SATURATING CLUTTER MITIGATION BY WAVEFORM SELECTION

CROSS REFERENCE TO RELATED APPLICATION

The invention is a Continuation-in-Part, claims priority to and incorporates by reference in its entirety U.S. patent application Ser. No. 14/296,297 filed Jun. 4, 2014, published Oct. 22, 2015 as Publication 2015/0301158 and assigned Navy Case 103064, which pursuant to 35 U.S.C. § 119, claims benefit of priority from provisional application 61/980,627 filed Apr. 17, 2014.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to providing mitigation of dynamic range overload in radars. In particular, the invention maximizes track and detection ranges when there is overloading or saturating at the radar receiver from clutter or large targets.

Ground clutter and large targets produce large amplitude signals at the radar receiver. If the amplitude of the signals exceeds the dynamic range of the receiver, then the data output from the receiver are unreliable. Subsequent signal processing of the unreliable data further expands the range extent of unreliable data. Under such circumstances, range gates can develop that render the radar effectively blind, thereby precluding detection of a target.

For example, for a single large amplitude scatterer with a length of 100 feet causing receiver saturation for a 10% duty radar, then 20% of all range gates would have unreliable data and be incapable of reliably detecting targets. Thus, a medium pulse repetition frequency (PRF) radar using range ambiguous processing and searching to 100 miles would be blind for 20 miles of the 100 miles even though the length of the target is only 100 feet.

The reason that in this example a single saturating target can have such an adverse influence is that the saturation time is extended by the pulse width of the radar in the receiver causing the loss of 10% of the range space. The subsequent signal processing of the unreliable data stretches by the matched filter producing total of 20% unreliable data.

SUMMARY

Conventional radar waveform selections are designed to maximize detectability without regard to the effects of saturation and therefore yield disadvantages addressed by various exemplary embodiments of the present invention. In particular, a method is provided for maximizing surveillance volume in a radar system that also accounts for saturation. The method includes determining saturation range probability $\bar{f}_{sat}$ for each waveform and process option; determining sensitivity probability $f_{sens}$ for each waveform and process option; calculating surveillance volume probability by multiplying the saturation range probability by the sensitivity probability as $V_s = \bar{f}_{sat} f_{sens}$; and selecting the waveform and process option that maximizes the surveillance volume probability.

BRIEF DESCRIPTION OF THE DRAWINGS

These and various other features and aspects of various exemplary embodiments will be readily understood with reference to the following detailed description taken in conjunction with the accompanying drawings in which like or similar numbers are used throughout, and in which:

FIG. 1 is a timeline view of a range gate for a radar transmission pulse;
FIG. 2 is a timeline view of a series of range gates;
FIG. 8 is a tabular view of first example of a single saturating scatterer,
FIG. 9 is a tabular view of a second example of five non-overlapping scatters with 10 dB of saturation;
FIG. 10 is a tabular view of a third example of five non-overlapping scatters with 10 dB of saturation.

DETAILED DESCRIPTION

Figure 3:
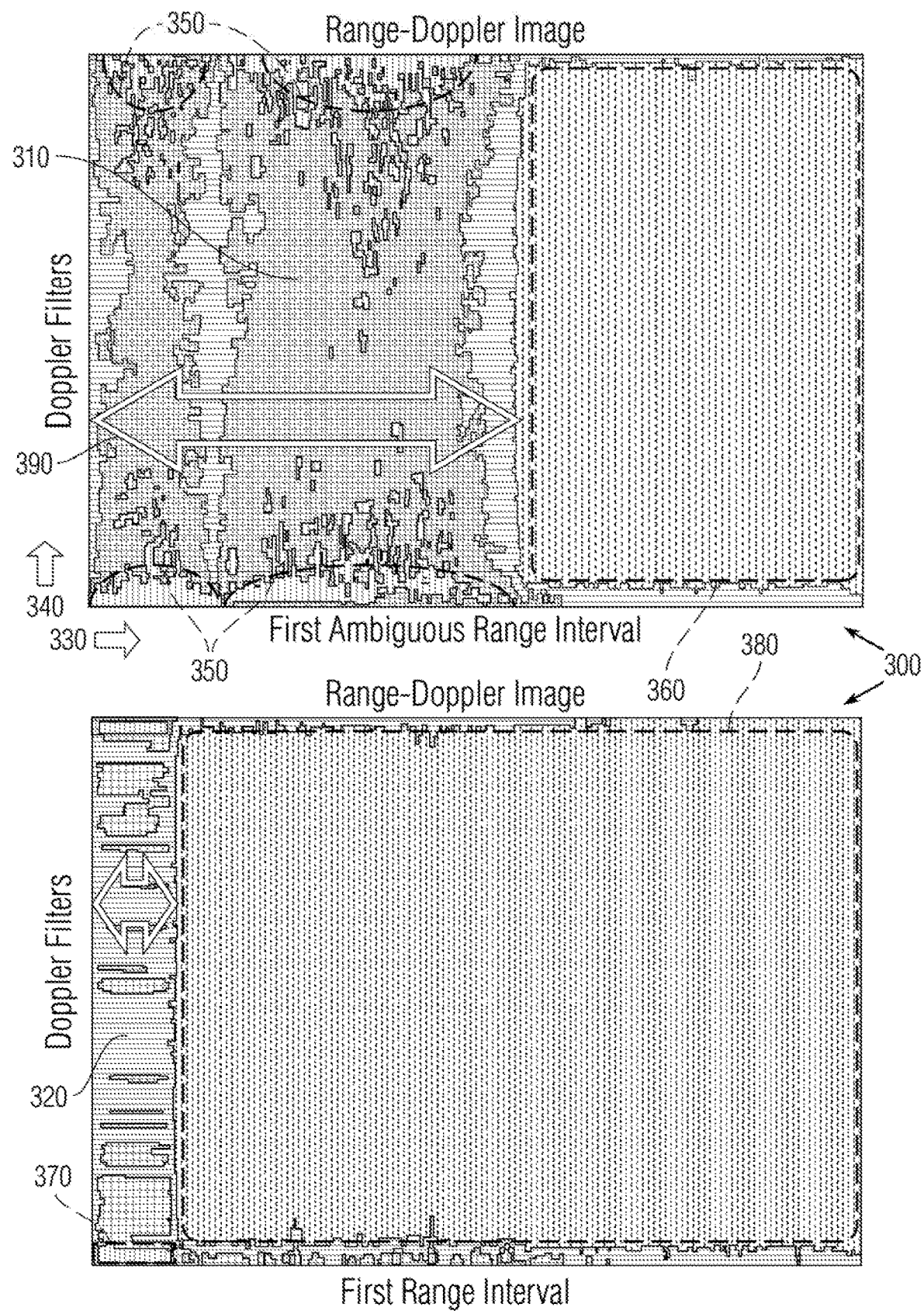
FIG. 3 is a set of contour plots of Doppler and Range bins.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 1 shows a timeline view 100 of an Inter Pulse Period (IPP) and the saturation effect. A chronometric interval 110 represents the effective period of a timeline 120. This time corresponds to range in that radar systems determine range-to-target based on the time required to receive the target echo. The interval 110 begins at start 130 until reaching minimum range 140 and continues until end 150. A recovery cell 160 for the radar extends from the start 130 to the minimum range 140, followed by saturation periods 170 and 180, separated by a gap 190.

Thus cell interval 160 is the period of time the radar receiver is gated off to compensate for the transmit time and receiver recovery time. Target detection is impossible in this cell 160. Signal saturation seriously reduces sensitivity in the range gate, e.g., the interval 110 the saturation occurs within. This renders detection of targets within those range gates virtually impossible.

The diagram view 100 shows the ranges that the radar is saturated and thus cannot detect targets. In this example periods 170 and 180 indicate saturation regions where detection of targets would be impossible. The likely source of saturation is clutter at near range, as clutter at longer ranges does not saturate the radar receiver. However, because the radar can employ multi-pulse Doppler processing, the saturated ranges fold out so as to affect target detection at longer ranges. These processing techniques include Moving Target Indicator (MTI), Moving Target Detector (MTD), or Pulse Doppler (PD).

FIG. 2 shows an expanded timeline view 200 of repeating intervals 110 within an extended timeline 210 (effectively repetition of the timeline 120) for an unambiguous range. Although saturation usually occurs at close ranges, these blind ranges fold out because the IPP is ambiguous in range. Thus for IPP being X % saturated, the radar has lost that corresponding fraction of its entire surveillance volume. View 200 illustrates why short range clutter can cause long range targets to not be detected. For example, assume the first IPP has inhibited detections for 40% of its range gates. This IPP may only cover a range of 10 nautical miles (nm). However, due to folding effects, targets at ranges longer than 10 nm might not be detected.

Various exemplary embodiments minimize the reduction of detection range and surveillance volume caused by receiver saturation due to clutter (and possibly slow-moving targets). This technique applies changes in the radar waveforms and attenuators in an optimum manner. This technique may often be applied by only software changes to the radar.

Designing radars with sufficient dynamic range such that their receivers will never be overloaded or saturated remains beyond the current state of the art. As a consequence, ground based radars may find themselves in situations where ground clutter causes the radar receiver to be saturated. In that situation, there will be range gates where the radar is blind. Saturation severely reduces sensitivity in the affected range gates, rendering detection of targets in those range gates virtually impossible.

Currently, radars modify their waveforms, attenuators, receiver sensitivity or transmitter power output to reduce the volume of space that is affected by detected saturation. This may be accomplished by manual or automatic techniques. These changes reduce the regions where the radar is blind. However, changes to waveforms, attenuators or transmitter power output reduce the radar's sensitivity. This in turn reduces maximum firm track range (FTR) and correspondingly the surveillance volume. Heretofore, there has been no conventional technique to conduct a proper tradeoff between reduction of saturation and minimization of sensitivity attenuation to maximize radar performance in saturating clutter environments.

There are two key elements to the exemplary embodiments. The first is the control strategy of applying waveform duty changes and other changes that maximizes the surveillance volume for a target of specified size and speed, and thereby distinguishable from clutter. The second is using multiple instances of Pulse Repetition Frequency (PRF) that minimize overlapping blind ranges on subsequent looks.

The control strategy is achieved by using two probabilities for maximizing surveillance volume $V_s$ of radar detection performance. The first parameter denotes the probability that any target in the surveillance volume will not overlap with saturating clutter. This parameter $\bar{f}_{sat}$ is defined as the negation of saturation range probability $f_{sat}$. This non-saturation parameter $\bar{f}_{sat}$ can also be conceived as the fraction of range cells that are unaffected by saturation.

FIG. 3 shows a contour plot view 300 for higher 310 and lower 320 saturation levels. Doppler bins 330 denote the abscissa while Range bins 340 denote the ordinate. This illustrates the increase of noise in Doppler Range produced by the saturation effect that causes clutter to appear across Doppler bins. Exemplary embodiments for radar hardware provide indication of saturation such that the percentage of saturated range gates can be determined for each waveform and sensitivity setting. These plots 310 and 320 provide examples of Range Doppler Maps that indicate the presence of saturation.

For the upper plot 310 denoting $\bar{f}_{sat}$~40%, left peripheral regions 350 indicates maximum amplitude while right center region 360 indicates minimum amplitude. For the lower plot 320 denoting $\bar{f}_{sat}$~80%, left peripheral region 370 indicates maximum amplitude while the center region 380 indicates minimum amplitude. Saturation bounds 390 for the plots 310 and 320 identify Range bins 340 in which targets cannot be readily detected, while the right center regions 360 and 380 indicate conditions in which radar can detect the targets.

Radars can detect the presence of saturation in at least three ways. First, the radar can monitor amplitude values produced by its analog-to-digital (A/D) converter. Maximum negative or positive values indicate saturated A/D samples. In some radars, using this technique is undesirable due to its high data rate of the A/D converter. In that case, saturation can be inferred at later processing stages in which the data rate has been reduced to correspond to the range gate sample size. The radar infers saturation based on large amplitudes measured at this stage of signal processing. Both these techniques can produce the saturation indicators shown in view 100. A third approach infers saturation from a Range Doppler map. An example of this is shown in contour view 300.

Under the assumption that targets occur randomly in range space according to a uniform distribution probability law, parameter $\bar{f}_{sat}$ is the probability that any given target is not in a saturated range cell. Thus, $\bar{f}_{sat}$ is determined for each setting of waveform sensitivity by the radar hardware, as described above. Changes in the radar's settings to reduce sensitivity correspondingly increase non-saturation probability $\bar{f}_{sat}$, indicating that there are fewer saturated range cells to inhibit target detection. FIG. 1 illustrates parameter $\bar{f}_{sat}$ as a timeline 120 denoting the percentage of range absent in periods 170 and 180. Thus, as the radar changes pulse widths, output power, etc., the parameter $\bar{f}_{sat}$ changes in response, as measured by the radar receiver.

The other value to be computed represents the probability that the target (corresponding to a specified size and speed) will be detected and tracked as $f_{sens}$, while ignoring saturation yet considering the sensitivity reduction due to radar setup changes. Hence, the probabilities $f_{sens}$ and $\bar{f}_{sat}$ are treated as independent variables.

The sensitivity probability $f_{sens}$ is determined from the design of the radar and its sensitivity requirements. Radars are designed to detect and track targets. The smallest radar cross range target at the farthest range sets the sensitivity requirement on the radar. Generally, there is a specified probability of detection or a specified cumulative probability of detection (often called cumulative probability of firm track) designated for the radar for the most challenging target (i.e., the smallest radar cross range target at the farthest range). B. R. Mahafza in *Radar Systems Analysis and Design using MATLAB* (pp. 159-170) shows how to calculate both the probability of detection and the cumulative probability of firm track as a function of range. See http://the-eye.eu/public/WorldTracker.org/Mathematics/All MATLAB Books Collection/Radar Systems Analysis and Design Using MatLab-Mahafza Bassem R.pdf.

Figure 4:
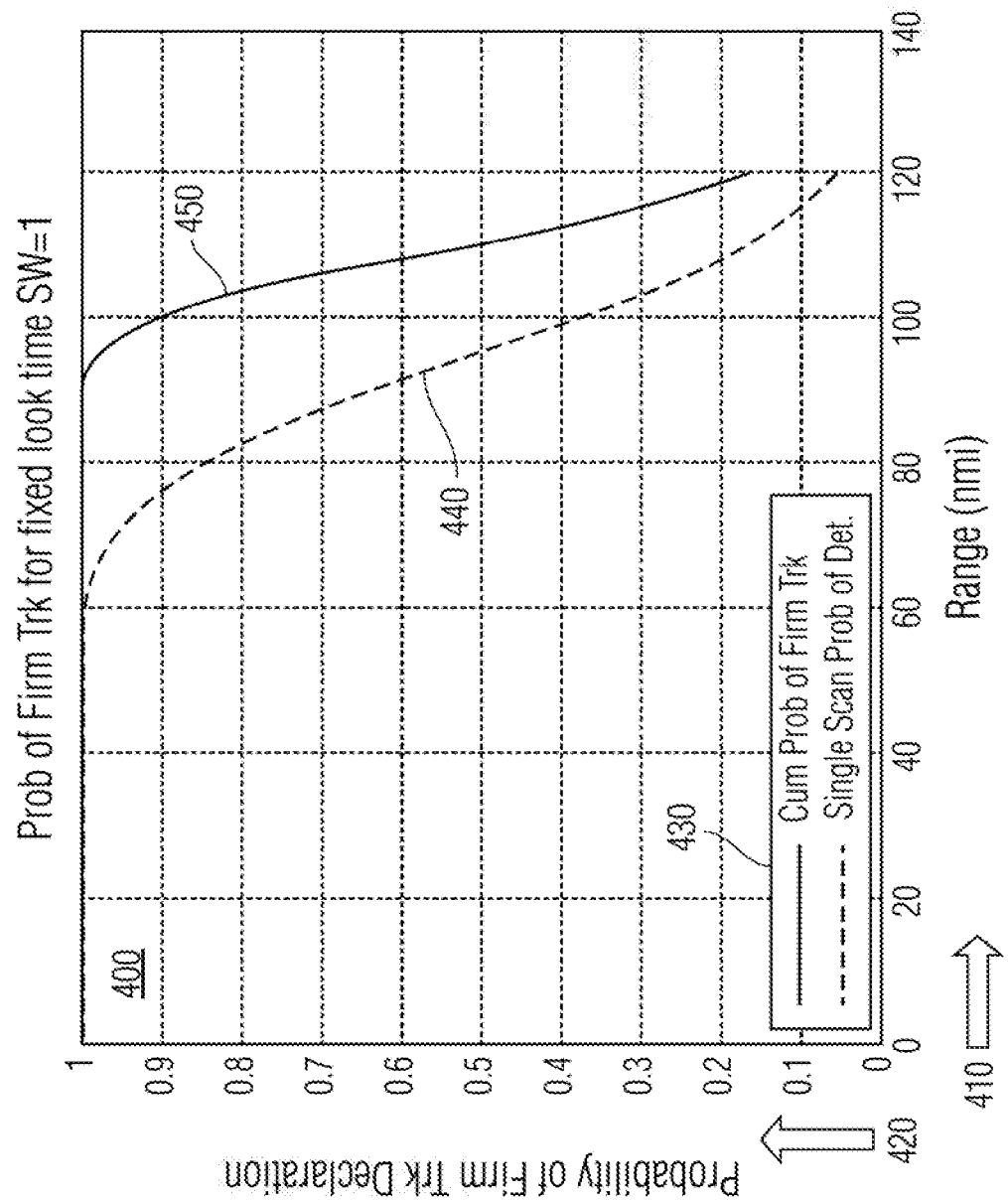
FIG. 4 is a graphical view of detection probability versus range.

FIG. 4 shows a graphical view 400 of the probability of firm track detection against range for an example set of conditions. Range 410 (in nautical miles) constitutes the abscissa and the Firm Track declaration probability 420 represents the ordinate. A legend 430 identifies curves for a single scan probability of detection 440 and the cumulative probability of firm track 450. Both detection probabilities remain at unity up to 50 nautical miles for this example, decreasing to half for the single scan probability 440 at ~95 nautical miles and for cumulative probability 550 at ~110 nautical miles.

Using the principals in Mahafza, FIG. 4 can quantify the probability of detection and cumulative probability of firm track for a hypothetical radar. For this hypothetical radar, the target fluctuates according to the Swerling I model (as described in § 4.6.2 at p. 161) and has a desired cumulative probability of detection at 100 nautical miles of 90%. Thus FIG. 4 describes the cumulative probability of detection of this smallest target at different ranges, such that when the radar is operating at full capacity with no adverse saturation effects its performance. Note that the signal-to-noise ratio (SNR) that Mahafza uses is determined by the radar design.

The sensitivity probability $f_{sens}$ indicates the fraction of detection range that remains based on sensitivity reductions employed to reduce saturation. To be more precise, $f_{sens}$ is the probability that any given target is within the maximum FTR. The FTR is the range that the radar can track a target with a specified probability (typically 0.9 or 90%). In other words, $f_{sens}$ is the probability that a target will be within the specified FTR with desensitization applied. Without applied desensitization, then $f_{sens}$ will be 100%, based on the assumption that targets are uniformly distributed from minimum range to the maximum FTR.

Figure 5:
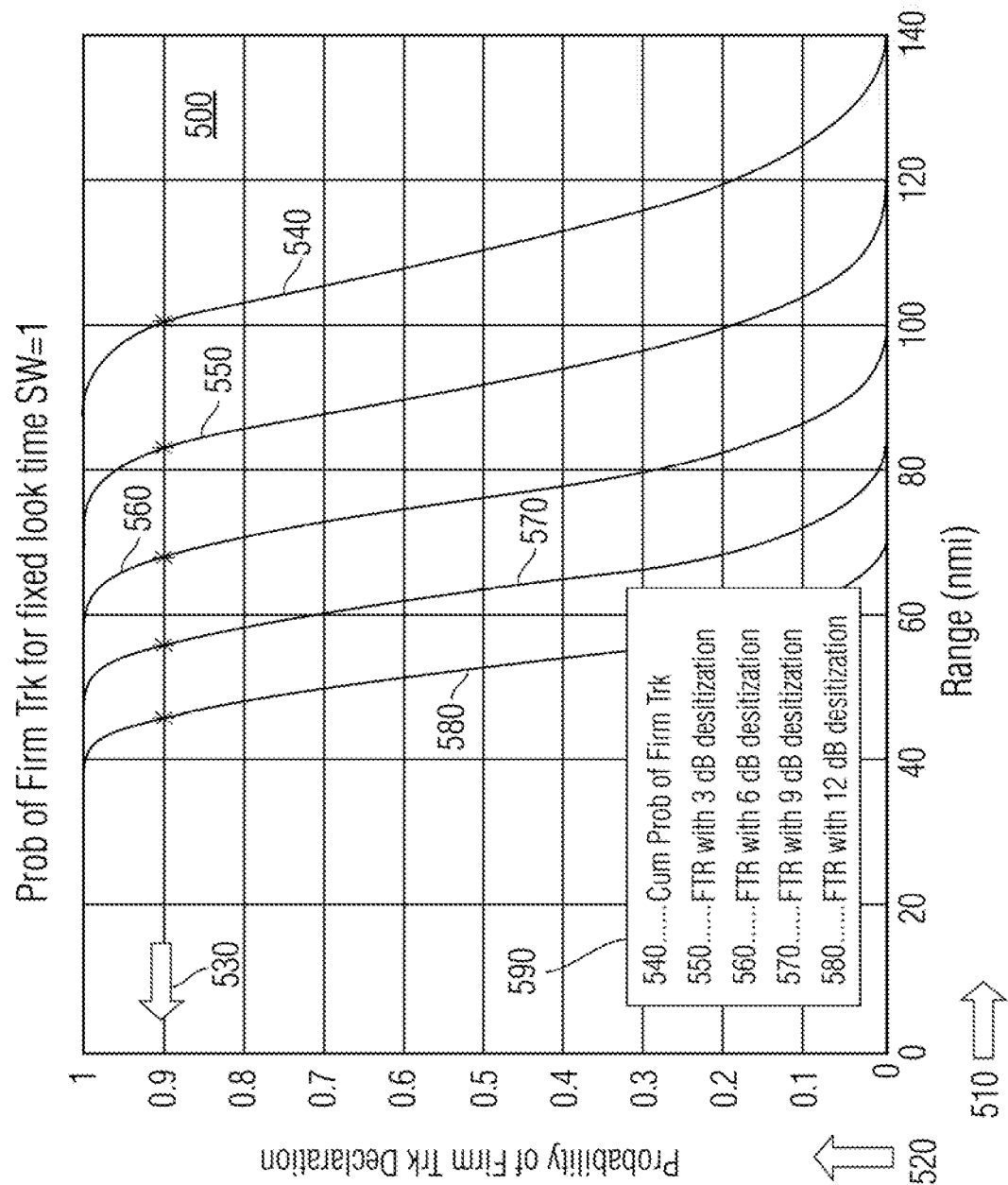
FIG. 5 is a graphical view of detection probability as sensitivity is reduced.

FIG. 5 shows a graphical view 500 of the probability of firm track for fixed look time versus probability of detection with varying levels of desensitization. Range 510 (in nautical miles) constitutes the abscissa and the Firm Track declaration probability 520 represents the ordinate. Probability marker level 530 at 90% as a specified value denotes an example design probability for this example. Cumulative firm track range (FTR) 540 with marker range at 100 nautical miles denotes the response 450 with no desensitization. Comparative FTR curves with 3 dB desensitization 550, 6 dB desensitization 560, 9 dB desensitization 570 and 12 dB desensitization 580 progressively exhibit decreasing marker ranges of 83 nautical miles, 68 nautical miles, 56 nautical miles, and 46 nautical miles, respectively. These curves are summarized in legend 590.

Based on the techniques used by Mahafza, the probability of detection and the cumulative firm track range can be calculated for situations where the radar has been desensitized. For example, upon reducing the radar transmitter power, then the effective ranges decrease. These be recalculated as they have been shown for the hypothetical radar in FIG. 5 with the diminished radar performance for the specified target as the radar is desensitized. Specifically, the range at which the 90% cumulative probability of firm track is achieved reduces as the sensitivity decreases.

Figure 6:
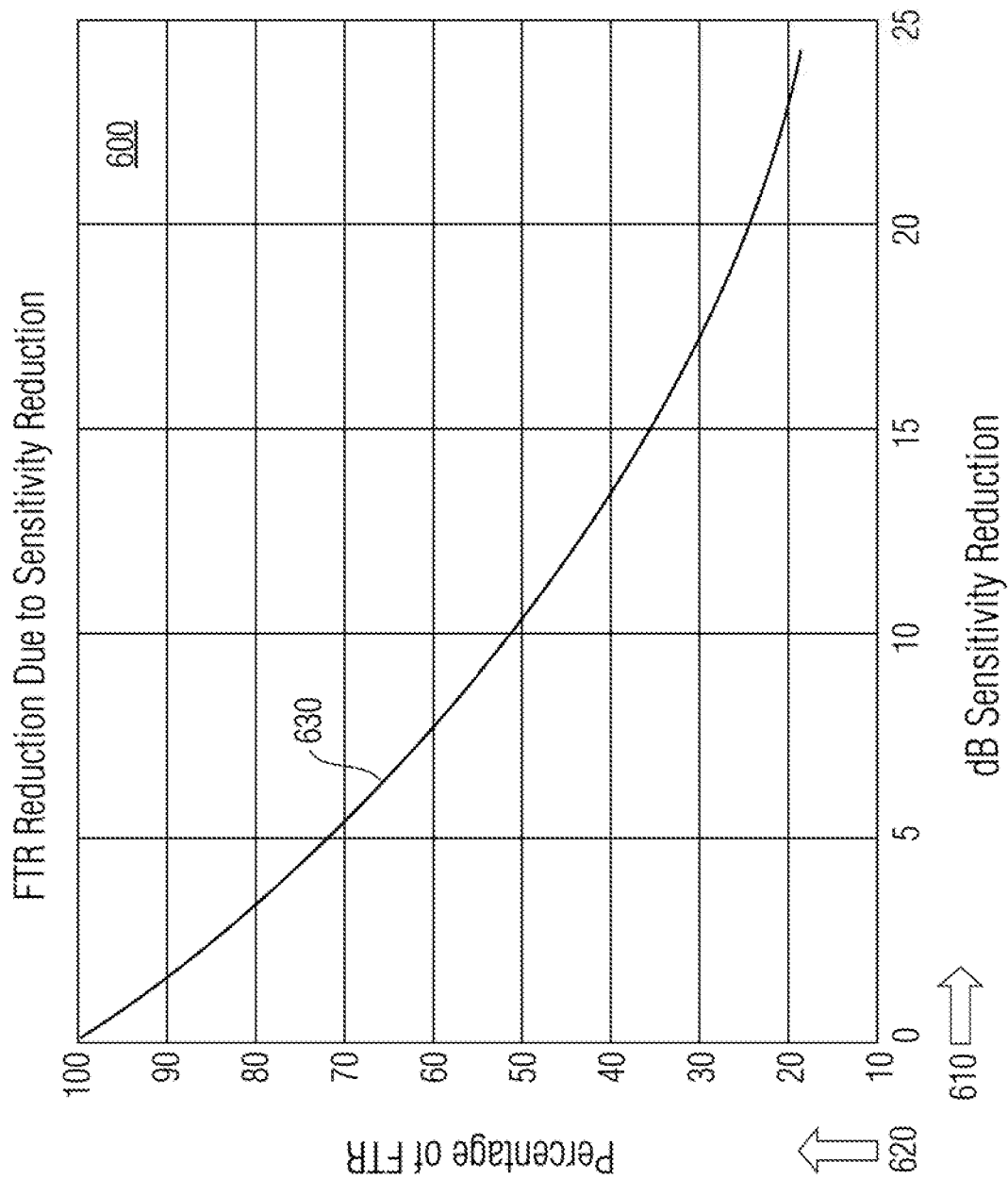
FIG. 6 is a graphical view of effect relating range to sensitivity.

Specified cumulative probability of firm track changes with sensitivity. FIG. 6 shows that this response can be plotted for this hypothetical radar with the percentage of cumulative probability of firm track range as a function of sensitivity reduction. This then is the sensitivity probability $f_{sens}$.

The sensitivity probability $f_{sens}$ indicates the fraction of detection range that remains based on sensitivity reductions employed to reduce saturation. To be more precise, $f_{sens}$ is the probability that any given target is within the maximum FTR. The FTR is the range that the radar can track a target with a specified probability (typically 90%). In other words, $f_{sens}$ is the probability that a target will be observed within the specified FTR with desensitization applied. Without applied desensitization, then $f_{sens}$ will be 100%, based on the assumption that targets are uniformly distributed from minimum range to the maximum FTR.

FIG. 6 illustrates sensitivity probability $f_{sens}$ as a plot view 600 of maximum firm track range (FTR) in response to Sensitivity Reduction calculated from radar parameters. Reduced sensitivity 610 (in decibels) constitutes the abscissa and the FTR percentage 620 represents the ordinate as the value of sensitivity probability $f_{sens}$. Response 630 corresponds to values of curves in legend 590 at probability marker 530.

The negative slope of response 630 shows corresponding diminution in FTR with greater sensitivity reduction, indicating that FTR decreases as sensitivity reduction is applied to mitigate saturation. The abscissa 610 identifies quantity of desensitization applied to the radar to mitigate saturation. For example, FTR is 100% at 0 dB, but reduces to about 51% at 10 dB. The response 630 can be algebraically expressed as exponential or power curve-fits or alternatively tabulated in a look-up table.

Based on this information, the probability that a target at any range cell in the surveillance volume will be put into track is computed as:

$$V_s = \bar{f}_{sat} f_{sens}, \qquad (1)$$

where surveillance volume $V_s$ represents a product of the non-saturation probability $\bar{f}_{sat}$ and the sensitivity probability $f_{sens}$. The surveillance volume $V_s$ is the probability that a target within the full sensitivity FTR will be tracked by the radar. Hence, this represents the probability that any given target is visible under the assumption that targets are uniformly distributed in range.

The exemplary control strategy is to maximize eqn. (1) for all possible settings of waveforms, attenuators and transmitter power settings. The surveillance volume $V_s$ considers the reduction in saturation that increases surveillance volume and the decrease in FTR caused by the sensitivity decrease required to diminish saturation.

The proper trade-off of sensitivity reduction with reduction in saturation of the radar can be accomplished by eqn. (1). This control strategy is optimum for a specified target size, and thus suboptimum for targets larger or smaller than the specified size. Therefore, the control is usually set for the smallest and/or fastest target that the radar must track because suboptimum performance for larger and/or slower targets is usually more tolerable.

The surveillance volume relation for eqn. (1) is based on the assumption that non-saturation and sensitivity probabilities $\bar{f}_{sat}$ and $f_{sens}$ constitute independent probabilities. This is justified under the condition that targets can be at any range cell and that the pulse repetition frequencies (PRFs) of the various waveforms have blind ranges that minimize overlap.

Radars often incorporate multiple PRFs to render a Firm Track decision. Additionally, radars often use different PRFs on subsequent searches in a given direction. This requires that the radar using multiple PRFs be selected so as to minimize the blind range overlap between all PRFs. This assures the independence of the probabilities $\bar{f}_{sat}$ and $f_{sens}$, and also guarantees that that $\bar{f}_{sat}$ is independent from search to search.

Non-saturation probability $\bar{f}_{sat}$ can be treated as independent between searches to ensure that if a target is missed on a first pass, that there remains a probability of being observed and detected on the next sweep of non-saturation probability $\bar{f}_{sat}$. Otherwise, missing a target on the first sweep would render likely continued non-detection on subsequent passes, until the target moves into range cells that were not saturated.

Figure 7:
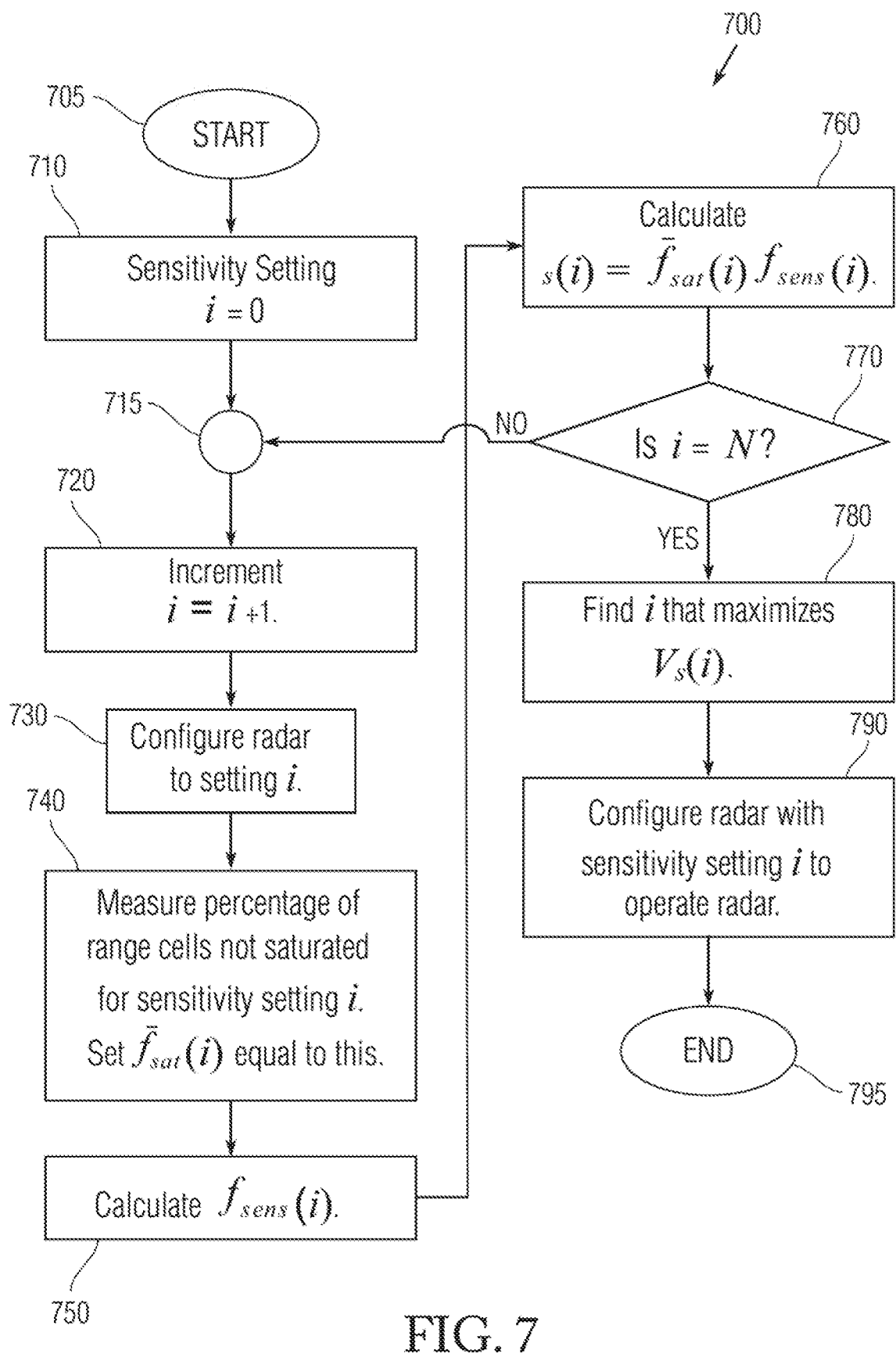
FIG. 7 is a flowchart view of search volume determination over a set of sensitivity settings.

FIG. 7 shows a process flowchart view 700 for calculating surveillance volume $V_s$ over a range of sensitivity settings. The process begins at Start 705, followed by initialization 710 of a sensitivity setting counter i to initiate a for-loop 715 a total number of radar settings N. The counter increments 720 from i=1, . . . , N for radar configuration 730. The process measures 740 the percentage of range cells not saturated for that setting counter and sets the non-saturation probability $\bar{f}_{sat}(i)$ to this value.

The process calculates 750 sensitivity $f_{sens}(i)$ for that setting counter such as example response 630 for the corresponding sensitivity reduction. The process proceeds to calculate 760 the surveillance volume $V_s(i)$ from eqn. (1) for that setting counter as a function of those probability and sensitivity values. The process queries 770 whether the counter has reached the total number N. If not, the process returns to for-loop 715. Otherwise, the process continues to identifying 780 the counter with the maximum surveillance volume for all settings. The radar is configured to the corresponding counter 790. The process then terminates 795.

To be effective, this process in view 700 must be executed for each look angle that may be affected by saturation. Further, this process should be re-executed assuming the amount of saturation is likely to change. The process configures the radar 730 into each waveform and sensitivity setting to measure the corresponding non-saturated fraction of range cells. The process also calculates the percentage of FTR that occurs for each setting. In the final stage, the process determines the sensitivity setting 780 that maximizes target visibility as V (i) and configures 790 the radar to this setting.

The surveillance volume $V_s$ can vary from its ideal at full power—from a dead zone at minimum radius from the receiver out to the ideal maximum range within which to detect and track an oncoming aircraft at cruise speed towards the radar. Reductions in transmitter power reduce the available range below its ideal maximum, while also shrinking the dead zone, with a net loss of surveillance volume. The exemplary process optimizes this surveillance volume to minimize clutter-based coverage gaps. An oncoming aircraft traveling on an oblique path towards the radar or at less than cruise speed may necessitate reductions in sensitivity to distinguish over clutter.

As an example consider a hypothetical radar that employs 10% duty waveforms. Further, this radar can reduce duty to 5% or 1% with the associated sensitivity loss if required to mitigate saturation. In addition, the radar can reduce its transmitted power by 8 dB to mitigate saturation. Based on the radar's transition to track policy and specified target size and speed, the reduction in FTR associated with sensitivity reduction as given in view 100 as a function of sensitivity reduction.

Three example cases can be considered for description. For the first case, there is one scatterer having an amplitude 10 dB above the saturation limit of the radar. Because the radar has 10% duty, the point scatter saturates the radar over 10% of the range space before pulse compression. After pulse compression, the saturated range cells will be doubled taking 20% of the range space. Given the hypothetical radar can adjust waveform duty and transmitter power, there are six possible options in operating the radar. FIG. 8 shows a tabular list 800 as Table I. The columns include transmitter power 810, duty percentage 820, sensitivity reduction 830, non-saturation probability 840, sensitivity probability 850 and surveillance volume 860.

The tabular view 800 enables observation that optimum setup (maximum surveillance volume $V_s$) is the radar's nominal setup of high power and full duty. Under this arrangement, the radar can expect to have its surveillance volume 860 reduced to 0.8 or 80% of its non-saturated surveillance volume. Under the conditions that the radar uses different PRFs (that minimize overlapping blind ranges), the cumulative probability of Firm Track increases on every search by the radar. This is the best that the radar can perform under this situation.

The second case involves the same radar with five non-overlapping scatterers whose amplitudes are 10 dB above the saturation point. (This means these scatterers do not share the same saturation regions 170 and 180 in the extended timeline 210.) After pulse compression, 100% of the range cells are affected by saturation. FIG. 9 illustrates the second case in tabular view 900 at Table II. The columns include transmitter power 910, duty percentage 920, sensitivity reduction 930, non-saturation probability 940, sensitivity probability 950 and surveillance volume 960. Note that attenuating a radar receiver has the same effect as altering transmitter power 910. Sensitivity probability 950 is affected by the relation to the sensitivity reduction 930 by the response 630.

As in the first case, reducing transmitter power 910 does not eliminate saturation because the transmitter power reduction is only 8 dB (i.e., low power setting). To eliminate saturation, the transmitter power 910 must drop by more than 10 dB. The optimum arrangement for the radar can be determined from Table II, which shows a preferred setting of 1% duty and high power. The surveillance volume 560 now decreases to 0.45 or 45% of its non-saturated volume.

The third case is similar to the second case except that the clutter is only 6 dB above the saturation threshold. FIG. 10 illustrates the third case in tabular view 1000 at Table III. The columns include transmitter power 1010, duty percentage 1020, sensitivity reduction 1030, non-saturation probability 1040, sensitivity probability 850 and surveillance volume 1060. Therefore, reducing the transmitter power 1010 by 8 dB (low power setting) causes all saturation to disappear. The tabular view 1000 in Table III illustrates this case and shows that the optimum setting is 10% duty with low power output. This yields surveillance volume 1060 of $V_s$=0.58.

Figure 11:
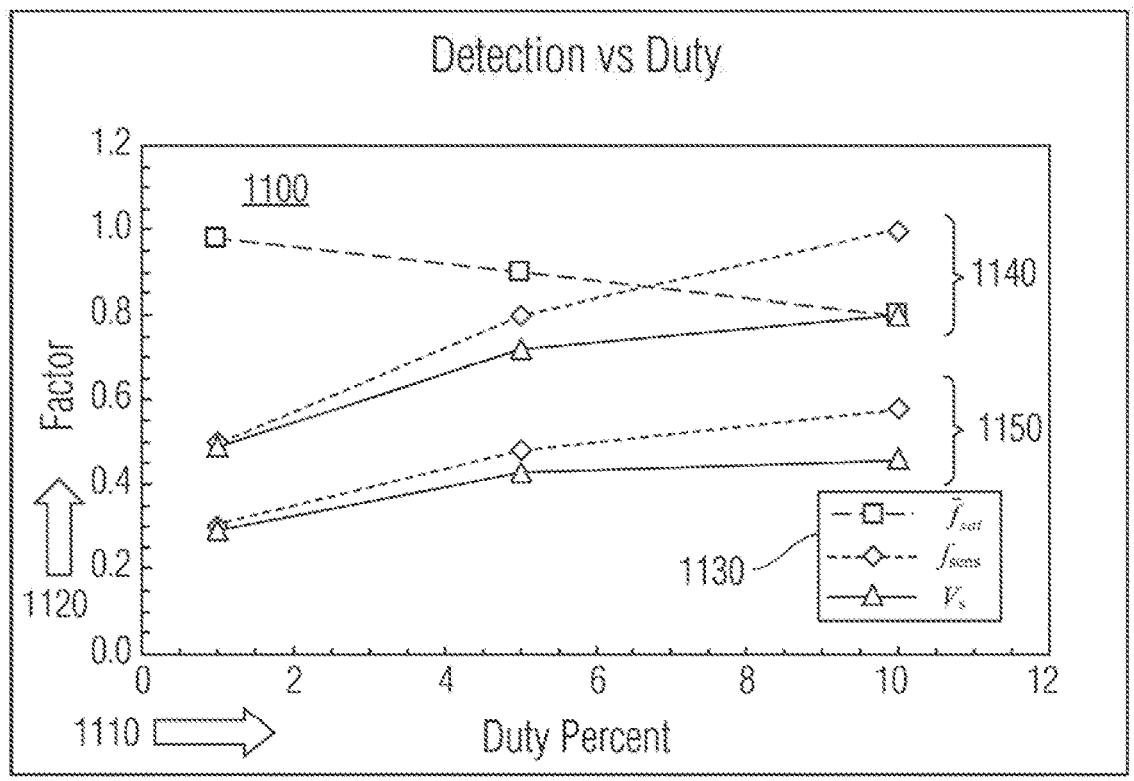
FIG. 11 is a graphical view of detection versus duty for one scatterer with 10 dB saturation.

The three aforementioned example cases can be visualized by accompanying plots. FIG. 11 shows a plot 1100 of detection versus duty for one scatterer with 10 dB saturation from Table I in view 800. The abscissa 1110 identifies duty percentage 820 of radar activity. The ordinate 1120 denotes the performance factor identified in legend 1130.

In particular, the performance factor represents non-saturation probability $\bar{f}_{sat}$ 840 by filled squares, sensitivity probability $f_{sens}$ 850 by filled diamonds, and surveillance volume $V_s$ 860 by filled triangles. The symbols as identified in the legend 1130 are also incorporated in subsequent plots. The sensitivity and surveillance volume points can be separated into two groups based on transmission power 810: high 1140 and low 1150 (at 8 dB reduction from high), with non-saturation probability 840 being insensitive to transmission power 810.

Figure 12:
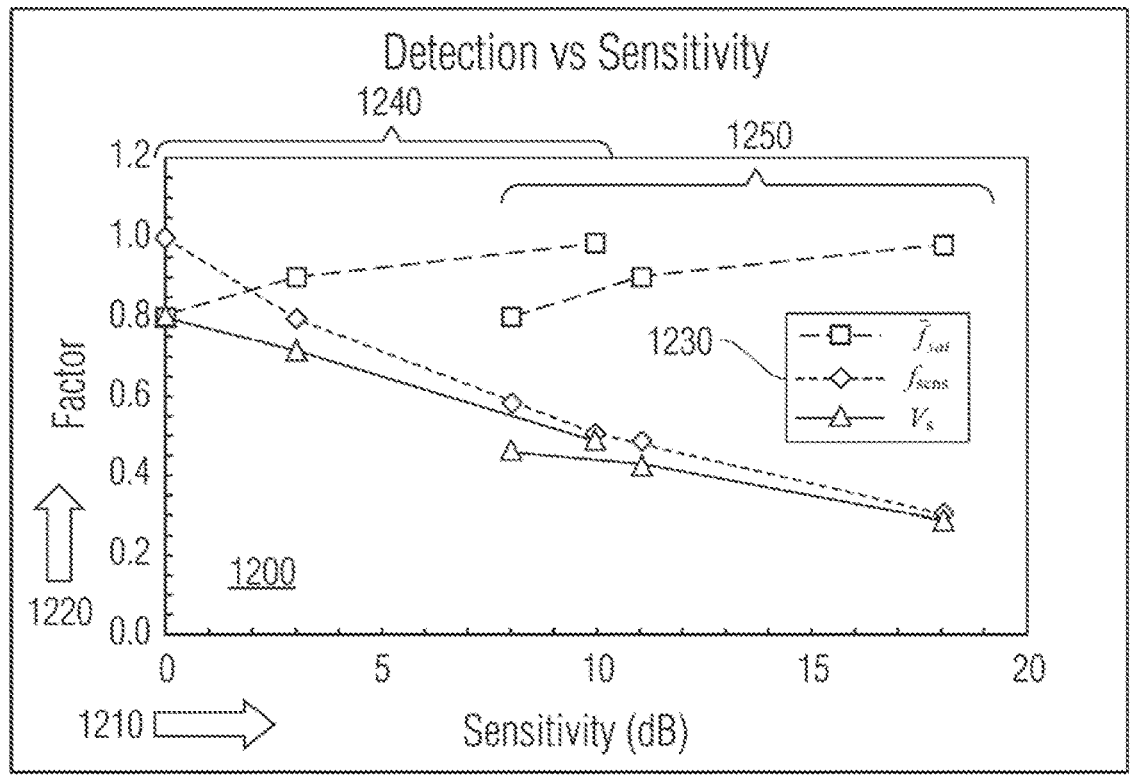
FIG. 12 is a graphical view of detection versus sensitivity for one scatterer with 10 dB saturation.

FIG. 12 shows a plot 1200 of detection versus sensitivity for one scatterer with 10 dB saturation from Table I in view 800. The abscissa 1210 identifies sensitivity reduction 830. The ordinate 1220 denotes the performance factor identified in the legend 1230. The points can be separated into high 1240 and low 1250 transmission power categories 810, which shifts sensitivity.

As can be observed, non-saturation 840 diminishes as duty percentage 820 rises. However, surveillance volume 860 maximizes at the higher duty due to increasing sensitivity with duty rising for both transmitter power levels. Similarly, non-saturation 840 increases with increased sensitivity reduction 830. Nonetheless, surveillance volume 860 maximizes with minimum sensitivity reduction 830 in response to sensitivity probability 850.

Figure 13:
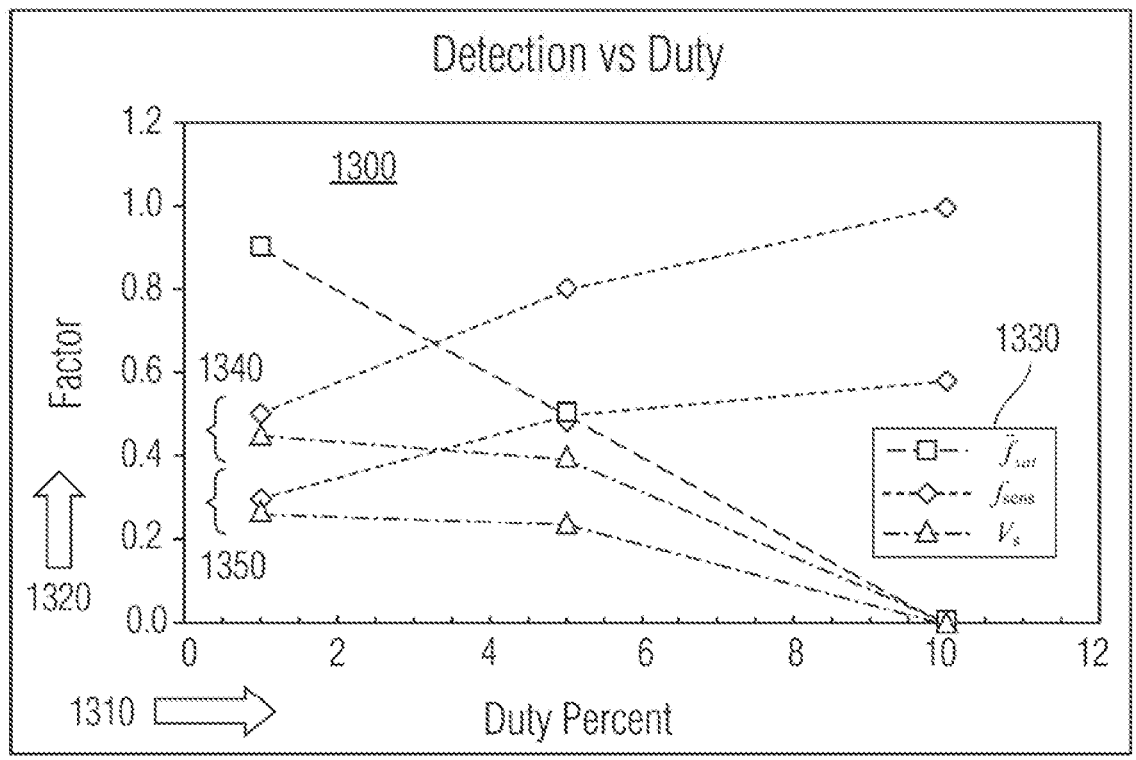
FIG. 13 is a graphical view of detection versus duty for five non-overlapping scatterers with 10 dB saturation.

FIG. 13 shows a plot 1300 of detection versus duty for five non-overlapping scatterers with 10 dB saturation from Table II in view 900. The abscissa 1310 identifies duty percentage 920 of radar activity. The ordinate 1320 denotes the performance factor identified in legend 1330. The points can be separated into high 1340 and low 1350 transmission power categories 910 for the sensitivity probability 950 and surveillance volume 960.

Figure 14:
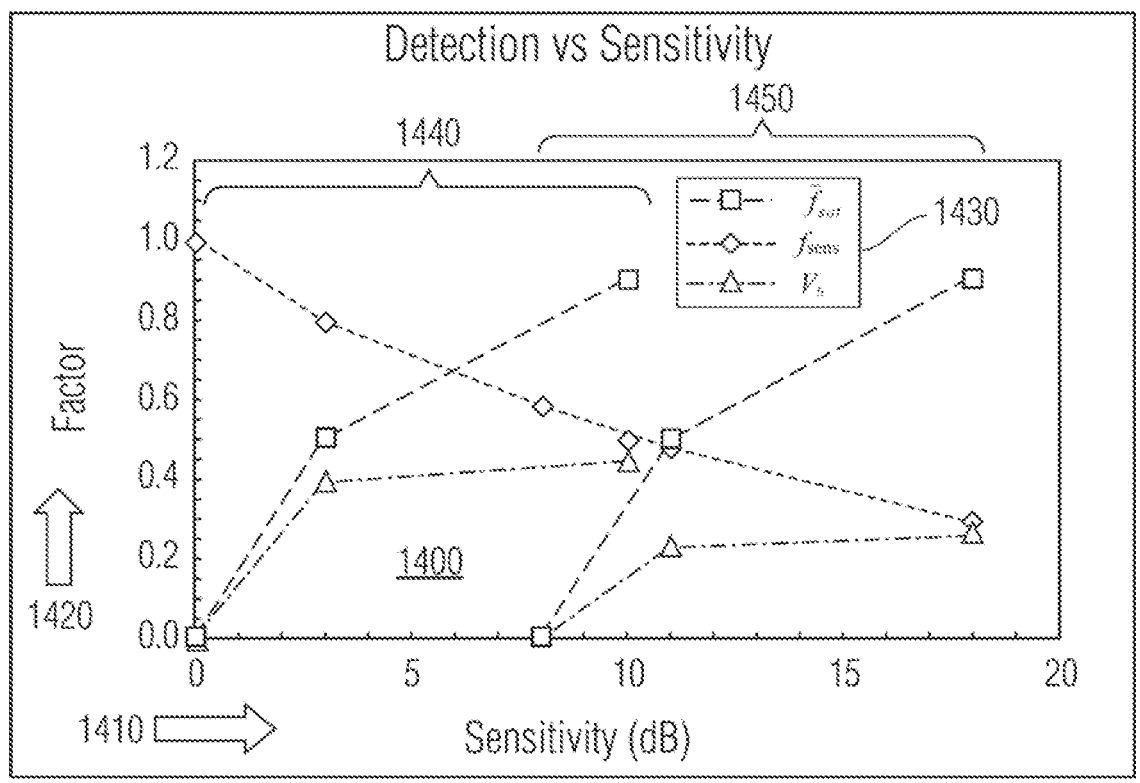
FIG. 14 is a graphical view of detection versus sensitivity for five non-overlapping scatterers with 10 dB saturation.

FIG. 14 shows a plot 1400 of detection versus sensitivity for five non-overlapping scatterers with 10 dB saturation from Table II in view 900. The abscissa 1410 identifies sensitivity reduction 930. The ordinate 1420 denotes the performance factor identified in legend 1430. The points can be separated into high 1440 and low 1450 transmission power categories 910, which shifts sensitivity.

For the additional scatterers, non-saturation 940 increases dramatically as duty percentage 920 is reduced, whereas sensitivity 950 diminishes. The resulting surveillance volume 960 as a product of these probabilities maximizes at the lower sensitivity. Similarly, non-saturation 940 increases with increased sensitivity reduction 930. Correspondingly, surveillance volume 960 maximizes with maximum sensitivity reduction 930 in contrast to sensitivity probability 950.

Figure 15:
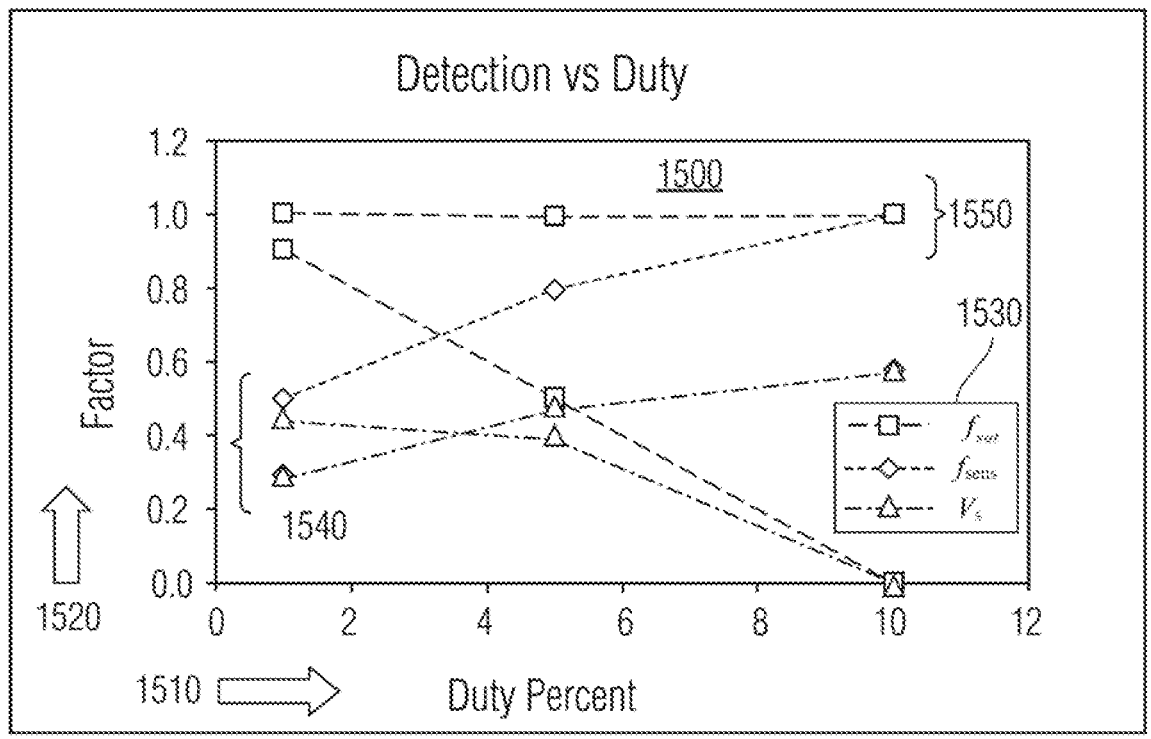
FIG. 15 is a graphical view of detection versus duty for five non-overlapping scatterers with 6 dB saturation.

FIG. 15 shows a plot 1500 of detection versus duty for five non-overlapping scatterers with 6 dB saturation from Table III in view 1000. The abscissa 1510 identifies duty percentage 1020 of radar activity. The ordinate 1520 denotes the performance factor identified in legend 1530. The points can be separated into high 1540 and low 1550 transmission power categories 1010 for the sensitivity probability 1050 and surveillance volume 1060.

Figure 16:
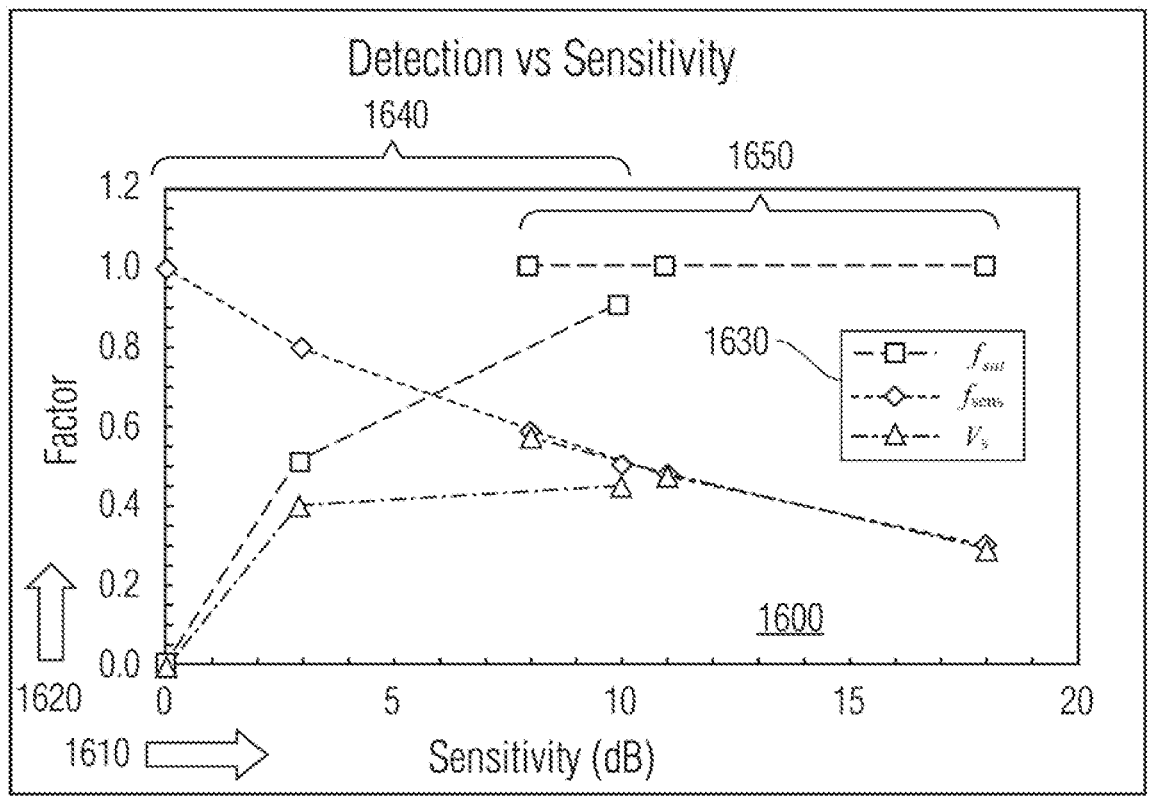
FIG. 16 is a graphical view of detection versus sensitivity for five non-overlapping scatterers with 6 dB saturation.

FIG. 16 shows a plot 1600 of detection versus sensitivity for five non-overlapping scatterers with 6 dB saturation from Table III in view 1000. The abscissa 1610 identifies sensitivity reduction 1030. The ordinate 1620 denotes the performance factor identified in legend 1630. The points can be separated into high 1640 and low 1650 transmission power categories 1010, which shifts sensitivity.

For reduced saturation with the five scatterers, non-saturation 1040 rises with reduced duty percentage 1020 at high transmitter power but remains optimally flat at lower power, whereas sensitivity 1050 diminishes with duty reduction at both power levels. The resulting surveillance volume 1060 as a product of these probabilities peaks at 8 dB depending on power level 1010. Similarly, non-saturation 1040 at high power increases with greater sensitivity reduction 1030. Correspondingly at high power, surveillance volume 1060 maximizes with maximum sensitivity reduction 1030 in contrast to sensitivity probability 1050.

With the additional scatterers subject to diminished saturation, non-saturation 1040 increases dramatically as duty percentage 1020 rises, whereas sensitivity 1050 diminishes. The resulting surveillance volume 1060 as a product of these probabilities maximizes at the lower power. Similarly, non-saturation 1040 increases with greater sensitivity reduction 1030. Correspondingly, surveillance volume 1060 maximizes with maximum sensitivity reduction 1030 in contrast to sensitivity probability 1050.

Six sensitivity settings (N=6) for flowchart view 700 have been described herein that influence surveillance volume:

(1) transmitter power that when raised (from 8 dB reduction to full power), increases sensitivity $f_{sens}$ and thereby surveillance volume $V_s$, (2) duty cycle that when elevated (i.e., increasing pulse duration and reducing interval time between pulses), reduces non-saturation probability $\bar{f}_{sat}$ and increases sensitivity $f_{sens}$ with the net effect of increasing surveillance volume V;

(3) sensitivity reduction that inversely affects sensitivity $f_{sens}$;

(4) number of scatterers (presumably within the clutter) that for a given saturation reduce non-saturation probability until offset by increase in sensitivity reduction;

(5) saturation level of the radar scatterers that, for a given number of scatterers, reduces non-saturation probability with as saturation increases; and (6) overlap level of multiple radar scatterers, such that raising the overlap increases non-saturation probability $f_{sat}$ and thereby surveillance volume $V_s$.

Furthermore, the exemplary algorithm is very simple and will not stress computing resources of existing radars. This process can be implemented automatically by computer software and/or hardwired in electronic hardware. The alternatives to using this algorithm are limited. Currently, there two approaches to this problem. The first is to apply sensitivity reductions in an ad hoc manner that could seriously degrade the performance of the radar. The second method described in European patent EP 2342581 and issued as U.S. Pat. No. 8,599,060 for clutter reduction in detection systems. This approach requires two receive beams and switching within an IPP. This technique is more complex in terms of radar equipment and degrades the radar's ability to cancel clutter due to switching within the IPP.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method in a radar system for optimizing radar performance of a transmission signal to detect a target against clutter by minimizing saturation while maintaining sensitivity, said target responding to said transmission signal as a scatterer said method comprising:

establishing a sequence plurality of radar settings for the radar system to transmit based on expected size and speed of the target that responds to a radar, each radar setting including a power level for transmission power, a waveform duty cycle and a sensitivity reduction;

determining non-saturation range probability $\ddot{f}_{sat}$ for said each radar setting from said sequence plurality with at least one scatterer presumed in the clutter, said non-saturation range probability denoting a portion of radar range unaffected by saturating clutter, said non-saturation range probability depending on said power level and said duty cycle for a corresponding radar setting;

determining sensitivity probability $f_{sens}$ of the target detection for said each radar setting from said sequence plurality in response to said sensitivity reduction;

calculating surveillance volume from multiplying said saturation range probability by said sensitivity probability as $V_s = \ddot{f}_{sat} f_{sens}$ for each said radar setting as a corresponding plurality of surveillance volumes;

identifying maximum surveillance volume in said plurality of surveillance volumes $v_s$ and its associated maximum volume radar setting;

selecting the transmission signal for maximum volume duty cycle and maximum volume power level that correspond to said maximum volume radar setting for radar operation by the radar system; and emitting the transmission signal with said maximum volume duty cycle and said maximum volume power level for said radar operation by the radar system.

2. The method according to claim 1, wherein the clutter includes a plurality of non-overlapping radar scatterers determined from a received signal in response to the transmission signal to adjust said non-saturation range probability.

* * * * *